United States Patent [19]
Quick

[11] 3,911,837
[45] Oct. 14, 1975

[54] LIQUID FERTILIZER INJECTOR

[75] Inventor: Fred L. Quick, Williamsfield, Ill.

[73] Assignee: Pearson Bros. Co., Inc., Galva, Ill.

[22] Filed: Dec. 18, 1972

[21] Appl. No.: 316,015

Related U.S. Application Data

[63] Continuation of Ser. No. 83,911, Oct. 26, 1970, abandoned.

[52] U.S. Cl. .................................................. 111/7
[51] Int. Cl. ........................................... A01c 23/02
[58] Field of Search .................................... 111/7, 6

[56] References Cited
UNITED STATES PATENTS

| | | | |
|---|---|---|---|
| 1,710,222 | 4/1929 | Hudson | 172/700 X |
| 2,285,932 | 6/1942 | Leavitt | 111/6 X |
| 2,691,358 | 10/1954 | Peck | 111/7 |
| 2,912,944 | 11/1959 | Snow et al. | 111/7 |
| 3,157,139 | 11/1964 | Spindler | 111/7 |
| 3,218,999 | 11/1965 | Pattison | 111/7 |
| 3,326,152 | 6/1967 | Frantzen | 111/7 |
| 3,410,234 | 11/1968 | Peifer | 111/7 |

Primary Examiner—Stephen C. Pellegrino
Attorney, Agent, or Firm—Henderson & Strom

[57] ABSTRACT

An attachment for a liquid fertilizer spreader to inject the fertilizer into the soil. The attachment includes a sub-frame secured to the frame of a conventional liquid manure spreader, a plurality of furrow-forming shanks pivotally connected to the sub-frame and a conduit unit interconnecting the spreader tank and the shanks for injecting the fertilizer into the furrow. The shanks are disposed adjacent to the wheels of the spreader for removing trash therefrom and to partially close the furrow.

4 Claims, 5 Drawing Figures

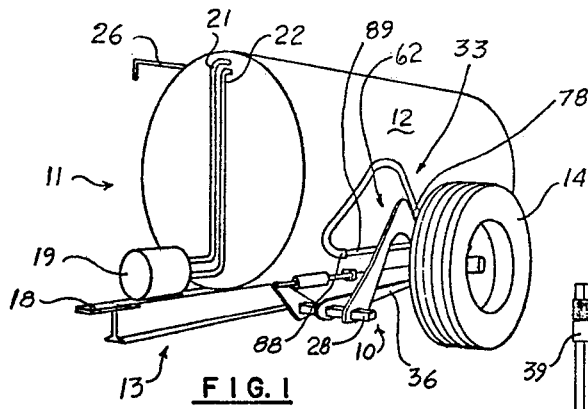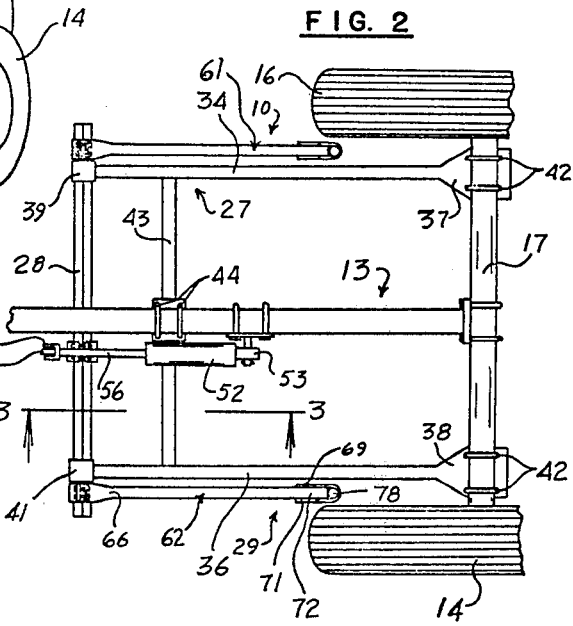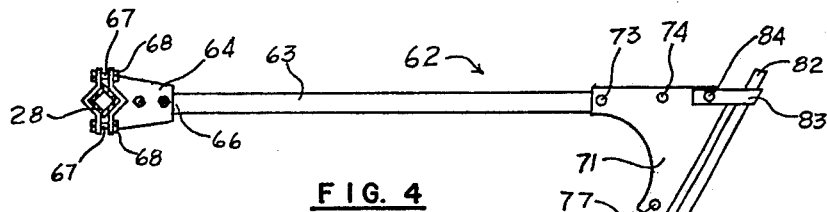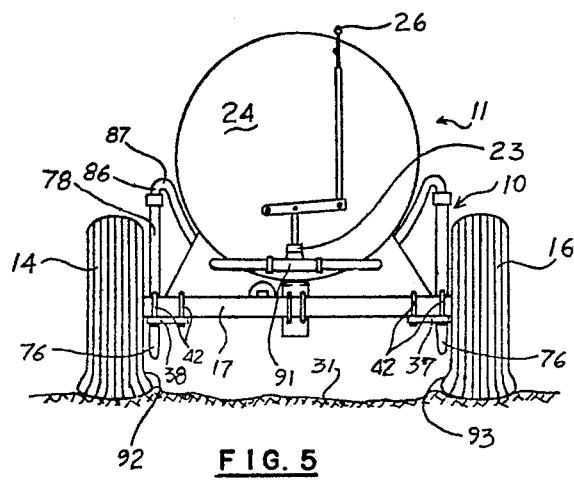

LIQUID FERTILIZER INJECTOR

This is a continuation of application Ser. No. 83,911 filed Oct. 26, 1970, now abandoned.

BACKGROUND OF THE INVENTION

This invention relates generally to agricultural implements and more particularly to an improvement in liquid manure spreaders capable of converting a broadcast spreader to an injection spreader.

Traditionally animal waste products, commonly known as manure, have been the farmer's main source of fertilizer. With the advent of feed lots and confined animal raising, the inherent waste products have been washed into pits or lagoons fluidly connected to the feed pens for sanitation purposes, creating a slurry, and thus the need for liquid manure spreaders.

The pits or lagoons serve as a reservoir to fill the typical tank spreader and the liquid manure is then transported to a field for purposes of spreading. Heretofore, the liquid manure has been broadcast on top of the soil in a spray or stream.

While the former described method did serve to empty the reservoirs, and did aid to some extent to fertilize the field; it failed in at least three areas to be ideal. First, it caused a horrendous odor much to the dismay of the surrounding farmers; secondly, it failed to place the fertilizing material under the soil surface where it is actually needed; and thirdly, it made the material highly susceptible to runoff and thus created the possibility of a water pollution problem.

The improvement of this invention is designed to overcome all of the above described problems by substantially converting a conventional broadcast liquid manure spreader to a spreader capable of injecting the material into the ground.

SUMMARY OF THE INVENTION

An improvement for a liquid fertilizer spreader having a tank capable of storing, conveying and distributing the fertilizer under pressure mounted on a wheeled frame, the improvement comprising a sub-frame connected to the frame of the spreader; a pivot bar extending normal to the axis of the frame and pivotally connected to the sub-frame; a power unit connected to the pivot bar for pivoting the pivot bar; a tool unit connected to the pivot bar for forming a furrow in the soil, the tool unit disposed adjacent to the spreader wheels; and a conduit unit connected to the tool unit and fluidly connected to the tank for injecting the fertilizer in the furrow.

It is an object of this invention to provide an attachment adaptable for use with substantially all conventional liquid manure spreaders.

It is yet another object of this invention to provide an attachment for a liquid manure spreader that is capable of injecting the liquid manure below the soil surface.

It is a further object of this invention to provide a liquid fertilizer spreader that removes inherent odors from the spreading operation, and substantially eliminates runoff and water pollution problems.

It is still a further object of this invention to provide a liquid fertilizer injector that is capable of injecting the fertilizer into the soil a selective depth.

Another object of this invention is to provide a furrow-forming tool in combination with a conventional liquid manure spreader for directing the odoriferous substance into the furrow and inherently closes the furrow subsequent to applying the injected material in the furrow.

Yet another object of this invention is to provide an injection attachment for a liquid fertilizer spreader that is simple to attach and use, economical to manufacture and purchase, and is rugged in construction.

These objects and other features and advantages of the improved fertilizer spreader of this invention will become apparent upon reference to the following description when taken in conjunction with the drawings.

BRIEF DESCRIPTION OF THE DRAWINGS

FIG. 1 is an elevational view of the liquid fertilizer injector improvement of this invention shown in relation to a conventional liquid manure spreader;

FIG. 2 is a plan view;

FIG. 3 is a cross-sectional view as taken along the line 3—3 of FIG. 2;

FIG. 4 is a side elevational view of furrow-forming tool portion; and

FIG. 5 is a rear elevational view.

DESCRIPTION OF THE PREFERRED EMBODIMENT

Referring now to the drawings and particularly to FIG. 1, the injector improvement of this invention is indicated generally by the numeral 10. The improvement 10 is shown in working relationship with a conventional liquid manure spreader 11.

The liquid manure spreader 11 (FIGS. 1 and 5) generally includes a tank 12 mounted on a frame 13 having wheels 14 and 16 rotatably connected to a cross-member 17 thereof. The frame 13 is provided with a forwardly extending hitch 18 adapted to connect the spreader 11 to a tractor (not shown) or the like, for transporting purposes. A pump 19 is attached to the frame 13 and is adapted to be operatively connected to the power take-off of the tractor (not shown). The pump 19 is fluidly connected to the tank 12 by pipes 21 and 22 for the purpose of selectively creating a vacuum in the tank 12 or to pressurize the tank 12. A valve 23 (FIG. 5) is connected to the rear wall 24 of the tank 12 to selectively open and close a port (not shown) formed therein to provide for loading and unloading the tank 12. The valve 23 is operatively connected to control rod 26 extending forwardly of the tank 12 to provide accessibility of the valve 23 to the operator of the tractor.

The injector improvement 10 (FIGS. 1, 2, and 5) of this invention generally includes a sub-frame 27 connected to the frame 13 of the spreader 11, a pivoot bar 28 pivotally connected to the sub-frame 27, a tool unit 29 connected to the bar 28 and adapted to form a furrow in the soil 31, a pivot unit 32 connected to the pivot bar 28 for pivoting the tool unit 29 about the axis of the bar 28, and a conduit unit 33 connected to the tool unit 29 and fluidly connected to the tank 12 for directing the fertilizer into the furrow.

The sub-frame 27 (FIG. 2) includes a pair of beams 34 and 36 having mounting plates 37 and 38 connected to one end thereof, and a pair pivot axially aligned ring members 39 and 41 connected to the other end thereof. The beams 34 and 36 extend forwardly of cross-member 17 and are connected thereto by U-bolts 42, or the like, securing the mounting plates 37 and 38 to the cross-member 17. The beams 34 and 36 are interconnected by crosspiece 43 traversing the frame 13. The crosspiece 43 serves to brace the beams 34 and 36 and is connected to the frame 13 by U-bolts 44, or the like.

The pivot bar 28 (FIGS. 1–4) extends normal to the axis of the spreader 11 and is rotatably mounted on the subframe 27 by ring members 39 and 41. The pivot bar 28 is an elongated bar appearing substantially square in cross-section.

The pivot bar 28 is pivoted about its axis by pivot unit 32 (FIGS. 2 and 3). The pivot unit 32 includes a pivot arm 46 securely connected to the bar 28 along the axis thereof by a brace plate 47, and bolt fasteners 48, or the like, interconnecting the pivot arm 46 and brace plate 47. The extended end 49 of the arm 46 is provided with an aperture (not shown) for receiving a pivot pin 51. A hydraulic cylinder 52 is pivotally connected at one end 53 thereof to a bracket 54 secured to the frame 13. The cylinder 52 includes a reciprocally movable piston 56 having a U-shaped member 57 secured to the extended end thereof. The U-shaped member 57 straddles the pivot arm 46 and is pivotally connected thereto by pivot pin 51. A pair of hydraulic lines 58 and 59 interconnect the cylinder 52 and the tractor (not shown) to power the cylinder 52 in a manner well known in the art.

The tool unit 29 (FIG. 2) includes a pair of furrow-forming tools 61 and 62 connected to the pivot bar 46 laterally of the beams 34 and 36. The tools 61 and 62 are identical and for purposes of brevity, only one tool 62 (FIG. 4) will be fully described.

The tool 62 (FIGS. 2 and 4) includes an elongated member 63 having a bracket 64 at one end 66 thereof. The bracket 64 embraces the pivot arm 46 and is securely fastened thereto by bolts 67 and nuts 68. A pair of gusset plates 69 and 71 straddle the extended end 72 of the member 63 and are secured thereto by fasteners 73 and 74. A furrow-forming shank 76 is disposed between the plates 69 and 71 and is connected thereto by shear pin 77. The shank 76 is vertically inclined, relative to the soil 31 and is adapted to form a narrow furrow in the soil 31 when in lowered position upon forward movement of the spreader 11 by the tractor (not shown).

The tool 62 is thus adapted to pivot in a vertical plane about the axis of the pivot bar 28. The tool 62 assumes an elevated position (FIG. 1) for transporting by pivoting the pivot arm 46 forwardly of the pivot bar 28. To embed the shank 76 in the soil 31, the piston 56 is drawn into the cylinder 52 to draw the pivot arm 46 rearwardly. The depth of penetration of the shank 76 may thus be selectively controlled by selective positioning of the pivot arm 46 by the piston 56 and cylinder 52.

The conduit unit 33 includes a dispenser tube 78 (FIG. 4) disposed immediately behind the shank 76 for dispensing the liquid fertilizer into the furrow. The lower end 79 of the tube 78 is securely fastened to the shank 76 by connecting member 81. The upper end 82 of the tube 78 is connected to the gusset plates 69 and 71 by strap 83 pivotally connected to the plates 69 and 71 by bolt 84. It can thus be explained that should the shank 76 shear from the plates 69 and 71, the tube 78 is free to pivot about bolt 84, and thereby prevent damage to the tube 78.

The upper end 32 of the tube 78 is fluidly connected to one end 86 (FIG. 1 and 5) of a flexible hose 87, fluidly connected at the other end 88 to conduit 89. The conduit 89 is disposed adjacent to the tank 12 and is fluidly connected to T-tube 91. T-tube 91 is fluidly connected to valve 23. It can be seen that the pressurized liquid exits the tank 12 through valve 23 and flows through T-tube 91, conduit 89, hose 87, and into the furrow through dispenser tube 78.

In operation, the tank 12 (FIG. 1) is conventionally filled and pressurized by the pump 19. The tools 61 and 62 are in elevated position for transporting the spreader 11 to the field. Upon arriving at the point desired to commence the fertilizing operation, the tools 61 and 62 are selectively lowered by the piston 56 and cylinder 52 to the desired depth of penetration. Simultaneously, the spreader 11 is drawn forward by the tractor, whereby the shanks 76 open a furrow and the valve 23 is opened by drawing the control 26 forward. The pressurized liquid thus flows freely through the dispensing tube 78 into the furrow.

The shanks 76 (FIG. 5) of the tools 61 and 62, in lowered position, are disposed adjacent to the inner walls 92 and 93 of the tires 14 and 16, respectively, such that any trash accumulated by the tools 61 and 62 is caught under the wheels 14 and 16, and thereby removed. Likewise, the weight of the spreader 11 coupled with the positioning of the wheels 14 and 16 relative to the furrow, inherently caves the wall (not shown) of the furrow on the dispensed liquid, and thereby serves to close the furrow.

An attachment for a liquid fertilizer spreader has thus been fully described which is easily adapted for use with substantially all conventional liquid manure spreaders, that solves the inherent odor problem, selectively places the fertilizer in the soil for greater fertilizing efficiency, and reduces the runoff and water pollution problems commonly associated with the spreading operation.

Although a preferred embodiment of the liquid fertilizer injector of this invention has been hereinbefore fully described, it is to be remembered that various modifications can be made thereto without departing from the invention as hereinafter defined.

I claim:

1. A manure spreader for injecting animal-manure slurry into the soil subsurface when drawn over the soil by a farm vehicle comprising:

a mobile tank assembly having a main longitudinal frame affixed at a forward end to the farm vehicle and at the opposite rear end having affixed thereto a plurality of tranversely spaced means for supporting said tank assembly and for engaging said soil to transmit at least a portion of the weight of said tank assembly for closing and packing furrows in the soil, a tank supported on said main frame, said tank having an outlet, and means to expel liquid manure from said tank through said outlet;

a plurality of furrow-forming assemblies;

a sub-frame secured to said main frame and extending along said main frame from a point adjacent said means for supporting and closing and packing forward therefrom to a point proximate said forward end of said main frame, a pivot bar rotatably mounted on said sub-frame transverse said main frame near said forward end of said main frame, a means for selectively rotating said pivot bar affixed between said pivot bar and said main frame, each of said furrow-forming assemblies having a beam extending rearwardly from said pivot bar, each of said beams having at a free end thereof a downwardly and forwardly inclined furrow-forming tool with a lower tip shaped to enter the soil, each of said beams, upon rotation of said pivot bar by said means for selectively rotating, being rotatable toward the soil to position said respective furrow-forming tool to enter the soil to a selected depth immediately forward of and in the line of travel of a respective one of said supporting and closing and packing means; and a tube mounted downwardly behind each of said furrow-forming tools and having a downwardly facing opening close behind the respective tip of the tool, conduit means interconnecting said outlet of said tank and each of said tubes, said furrow-forming tools upon selective rotation of said pivot bar while the manure spreader is traveling forward providing respective deep furrows for receiving animal-manure slurry discharged from the respective ones of said tubes, and said means for supporting and closing and packing traveling over the furrow and caving the sides of the furrow to close and pack the soil over the slurry.

2. A manure spreader as claimed in claim 1 wherein said tank assembly is an animal-manure-slurry spreader for broadcast application, said sub-frame to which said pivot bar and said furrow-forming assemblies are secured is an attachment, said attachment having mounting plates adapted to be readily secured to said main frame, and said plurality of means for supporting and closing and packing comprising transversely spaced-apart wheels for supporting said animal-manure-slurry spreader for broadcast application.

3. A manure spreader as defined in claim 1 and further wherein each of said means for supporting and closing and packing includes a wheel which supports the manure spreader above the soil and which engages the soil immediately behind the point of entry into the soil of a respective one of said furrow-forming tools.

4. A manure spreader as defined in claim 3 and further wherein each of said wheels are flattened against the soil, said wheels having portions extending laterally therefrom to a position directly behind each of a respective one of said furrow-forming tools, said portions being in engagement with the soil and passing directly over the furrows formed in the soil.

* * * * *